United States Patent [19]

de Bazelaire

[11] Patent Number: 4,624,550
[45] Date of Patent: Nov. 25, 1986

[54] METHOD AND APPARATUS FOR PHOTOGRAPHING SURFACES OF SOLID OBJECTS

[75] Inventor: Eric de Bazelaire, Lons, France

[73] Assignee: Societe Nationale Elf Aquitaine (Production), Courbevoie, France

[21] Appl. No.: 784,116

[22] Filed: Oct. 4, 1985

[30] Foreign Application Priority Data

Oct. 8, 1984 [FR] France ................... 84 15376

[51] Int. Cl.$^4$ ............................................. G03B 27/52
[52] U.S. Cl. .................................... 355/40; 352/84; 346/107 R; 346/107 W
[58] Field of Search ........ 355/40; 346/107 R, 107 W; 352/84, 69

[56] References Cited

U.S. PATENT DOCUMENTS

| | | | |
|---|---|---|---|
| 3,373,440 | 3/1968 | Jenkins et al. | 355/40 |
| 3,649,108 | 3/1972 | Ahrens et al. | 352/84 |
| 3,688,676 | 9/1972 | Cruickshank et al. | 346/107 R |
| 3,884,563 | 5/1975 | Evans et al. | 352/84 |

Primary Examiner—Monroe H. Hayes
Attorney, Agent, or Firm—Holman & Stern

[57] ABSTRACT

A system for photographing circumferential surfaces of revolution of solid objects such as core samples is of a type in which an object is rotated so as to progressively present the surface to a fixed photographic device in which a film is moved at a linear velocity synchronously with the speed of rotation of the object. The apparatus is characterized in that it includes a spray conduit for the humidification of the object during photography and a liquid tank and roller assembly for forming a thin film of fluid over the entire circumferential surface of the object during the photography thereof.

18 Claims, 4 Drawing Figures

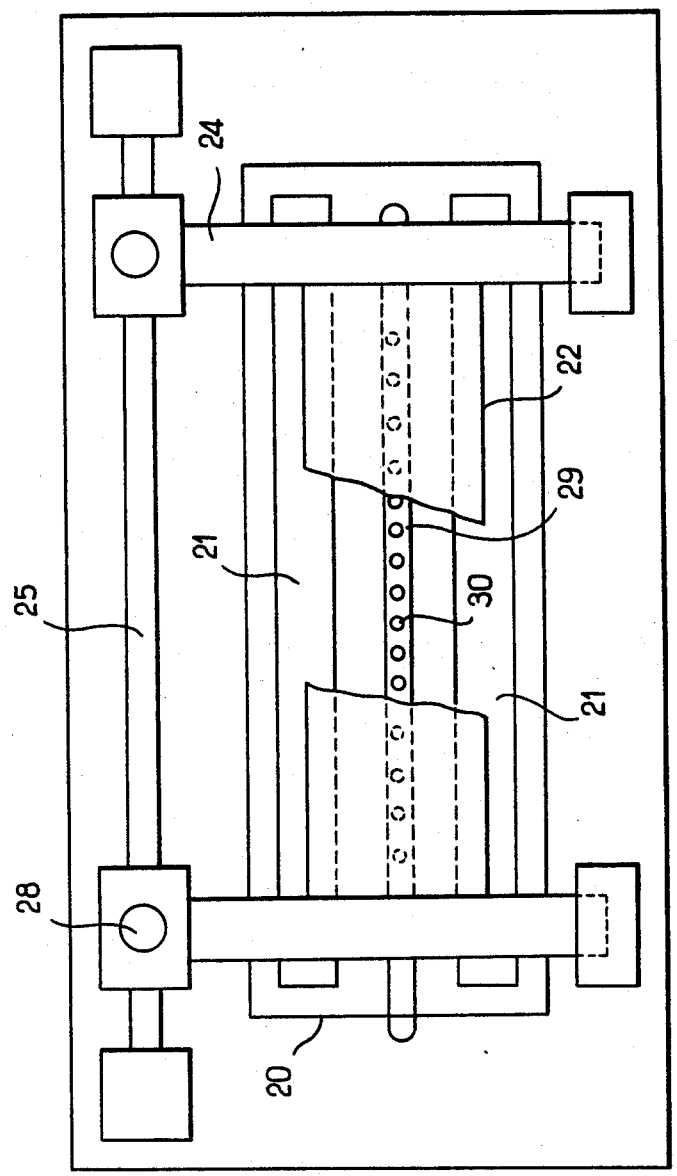
FIG_3

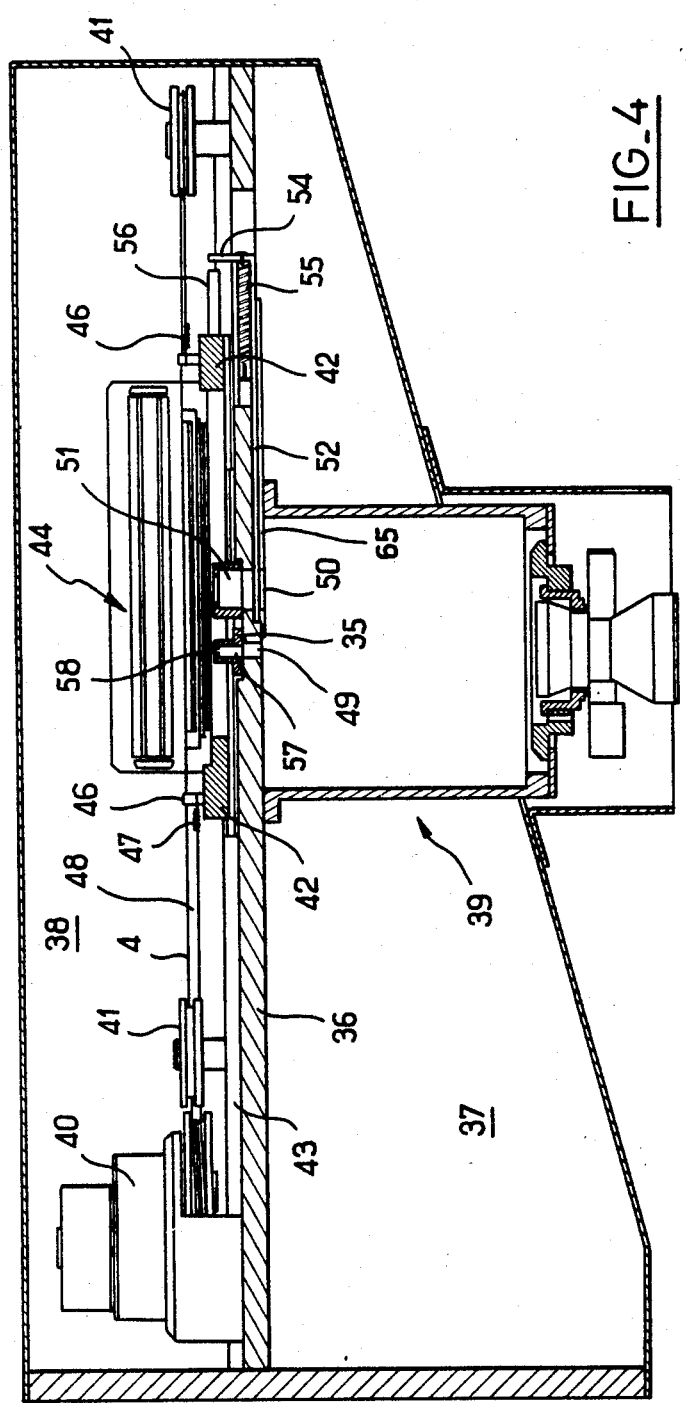
FIG._4

METHOD AND APPARATUS FOR PHOTOGRAPHING SURFACES OF SOLID OBJECTS

BACKGROUND OF THE INVENTION

This invention relates to a method and apparatus for photographing circumferential surfaces of revolution of solid objects, particularly objects which comprise samples of a substance which is being investigated.

When investigating a substance, or when on a larger scale attempting to gain knowledge concerning a solid substance, such as terrestrial subsoil, one of the first operations is generally to take samples of the substance in order to study certain of its characteristics.

In the field of mineral prospecting, particularly petroleum exploration, core samples are removed mechanically from the earth by a boring apparatus are generally in the form of cylindrical columns. Such cores, upon their arrival on the surface and during their extraction via an apparatus known as a corer, are typically broken up to some extend, due to preexisting faults in the cores, to breaks brought about by drilling and handling, or to internal tensions which are developed or become evident due to the change of surroundings. Core diameters are dertermined by the characteristics of the core drilling machine, and may range from a few centimeters to a few decimeters. After cleaning and removal of dust, the cores may be subjected to extensive tests by scientists such as exploratory sedimentologists, and those having responsibility for identifying productive deposits. All the personnel involved generally handle the cores and/or remove pieces for testing and other appropriate manipulation. When all these studies have been completed, a core is then inserted in an enclosed casing, duly marked, and then is stored over long periods, of the order of years—since there often arises a fresh need for a given core, for example to extend the preceding work or for new studies required by a new problem which may be presented in the course of oil production from a well or field for example. Storage of the cores in their casings takes up a great deal of space and requires major mechanical facilities for handling the casings. Further, regardless of the care taken to protect the cores during storage, it sometimes happens that some of the cores will be altered or degraded, leading to erroneous results in future tests.

An original solution to the problem of core degradation resides in photographing the cores in such a way that the photographs can be used as a record to provide required core information.

Attempts have been made to devise a satisfactory system of photography for objects of revolution, notably for purposes of archeological studies. The first system devised was designated "panoramic". It consisted of disposing the object to be photographed in a specific position, and then moving a photographic apparatus around the object.

An improvement over the first "panoramic" system involved eliminating the rotation of the photographic apparatus, and instead disposing the object to be photographed in front of the objective lens and rotating the object itself. As in a "panoramic" system, the image of the object is recorded on a photographic film which is moved linearly at the same speed as the speed of rotation of the object. Such a system is known as a "periphotographic system".

A different periphotographic system is described in French Pat. No. 2,530,302. It comprises a carriage upon which are mounted a rotating plate which supports the object to be photographed, a screen which defines a narrow slit extending vertically in proximity to the object; and a fixed photographic apparatus having an objective directed toward the screen which is interposed between the objective and the object to be photographed. Means is provided to rotate the plate at a uniform speed, and to displace the carriage linearly at a uniform speed which is synchronized with the speed of rotation of the plate, with the direction of displacement of the carriage being perpendicular to the optical axis of the photographic apparatus. The apparatus is well suited to objects having small dimensions and low weight (e.g., if they are vases). On the other hand, the apparatus is not well suited to heavy and/or large objects (such as mechanical cores) having length equal to or greater than 1 m.

Under such conditions, not only would it be necessary to provide a plate and a carriage both capable of supporting many kilograms, but it would also be necessary to supply attached means to coordinate the pieces of the core when the core is in a plurality of parts. Further, the fact that the slit is disposed between the objective and the object, (more precisely, in front of the object) requires that a long slit be provided, the length being at least equal to that of the maximum generatrix of the object being photographed. Moreover, even if the aforesaid difficulties are overcome, the quality of the photographs obtained with the system described in the patent may be inadequate, unless a relatively long time is taken to prepare the surface of each core in order to improve the quality of the photographs.

Finally, U.S. Pat. No. 3,373,440, discloses a system for photographing drilling cores which includes an endless moving belt upon which the core is disposed in one or more pieces. The system provides for advance of the core in the field of a photographic apparatus, the advance being equal to the displacement of the film. The photographs obtained are top views of cylindrical parts of the core brought into the field of vision. This is equivalent to taking simple photographs of cores moved in front of a fixed objective lens. In order to obtain a complete photograph of the lateral surface of the core, it is necessary to pass the core in front of the objective a number of times equal to the number of sections to be photographed, thus necessitating multiple placings of the core or of pieces of the core on the conveyor belt.

SUMMARY OF THE INVENTION

It is an object of the present invention to provide an improved system for photographing circumferential surfaces of objects such as cores, which may be automated, is simple and reliable in operation, and is adaptable to objects having a wide variety of dimensions.

Another object of the invention is to provide a means for effectively photographing an object without first having to specially repair the surface thereof.

The present invention provides photographic apparatus of the type comprising a support for an object to be photographed, means for rotating the support and the object, a fixed photographic device wherein a film is displaced at a linear speed which is synchronized with the speed of the rotation of the object, and means for illuminating the sample. The apparatus is characterized inter alia by the inclusion of means for humidifying the object and means for forming a thin film of fluid over the entire circumferential surface of the object during photographing of the circumferential surface. The invention further resides in the method of photographing objects using humidification and wetting of the surface being photographed.

Additional features and advantages of the invention will be apparent from the ensuing description and claims read in conjunction with the accompanying drawings.

BRIEF DESCRIPTION OF DRAWINGS

FIG. 3 is a plan view of a table portion of the apparatus; and

FIG. 4 is a cross-sectional view of a photographic portion of the apparatus.

DESCRIPTION OF PREFERRED EMBODIMENT

Figure 1:
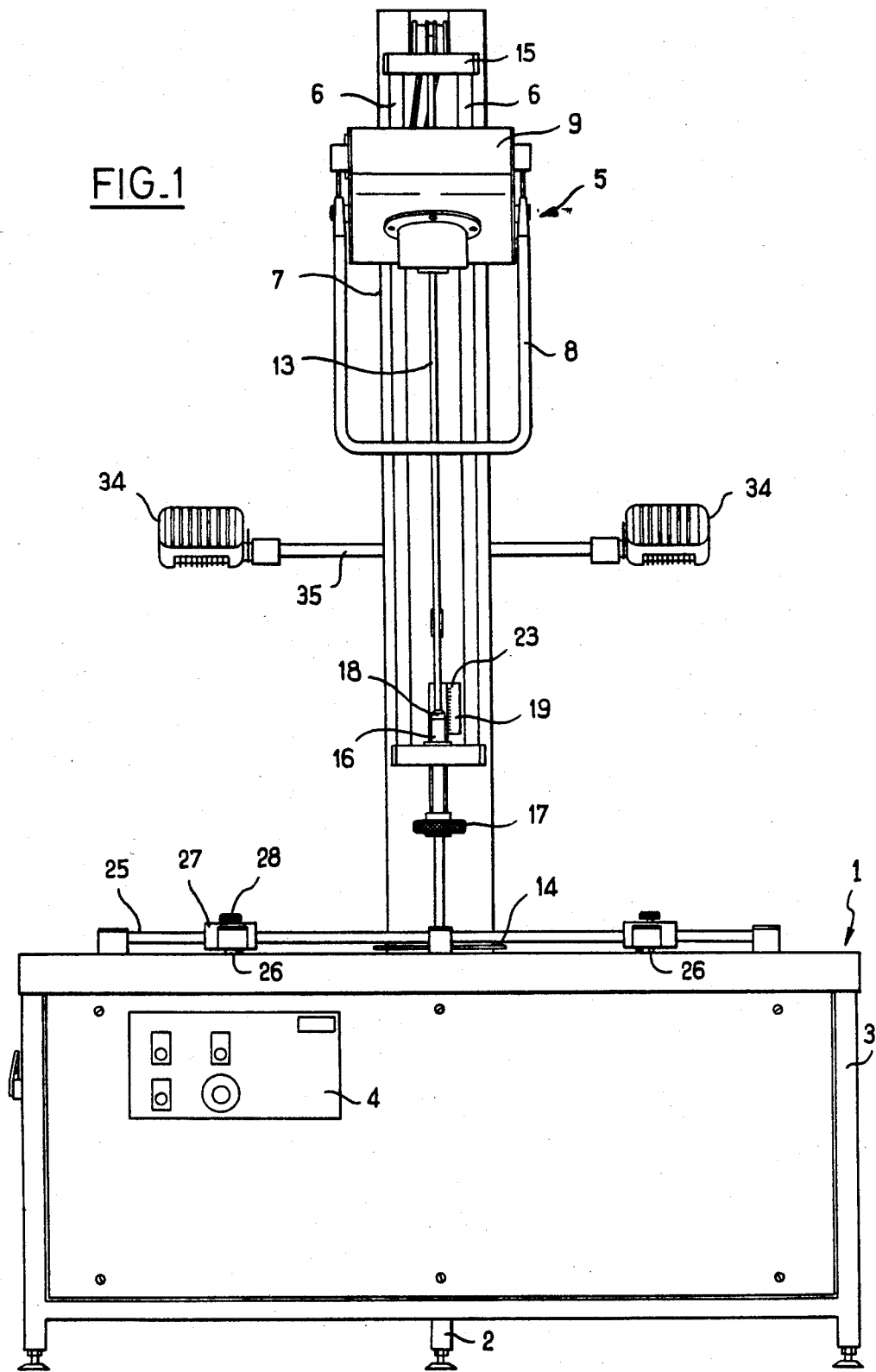
FIG. 1 is a front elevational view of the photographic apparatus in accordance with the invention.
Figure 2:
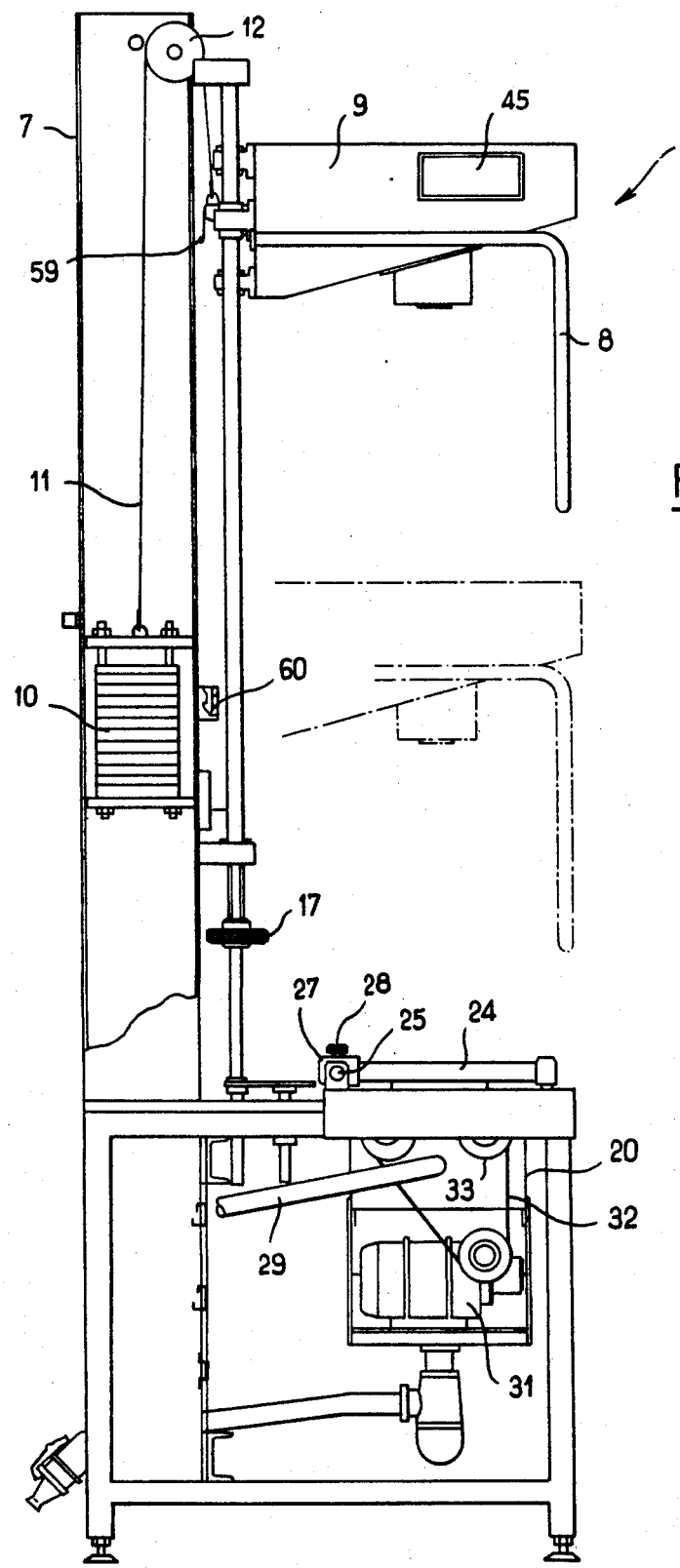
FIG. 2 is a side elevational view of the apparatus.

Referring initially to FIGS. 1 to 3 in particular, the illustrated apparatus includes a table 1 having a frame 2 mounted on four legs 3, the height of which legs are adjustable. A control panel 4 is mounted on one side of the table 1, for controlling movements of the various parts of the apparatus as described below.

A photographic device, designated in toto by reference numeral 5, is displaceable vertically with respect to the horizontal plane of table 1 along displacement rails 6 provided on a support member 7 mounted vertically on the frame 2. The photographic device 5 is displaceable by means of a handle 8 which is rigidly attached to a protective housing 9 of the device and which has the configuration of an inverted U. A counterweight 10 is accommodated in the support 7 and is connected to an element of the housing 9 by means of a cable 11 which passes over a pulley 12. The counterweight is slightly heavier than the photographic device 5. A vertical rod 13 of fixed length is connected at its lower extremity to a horizontal reference surface 14, and at its upper extremity to an adjustable detent 15. A screw 16, the movement of which is controlled by a wheel 17, has a reference mark 18 which is moved along a graduated scale 19. The scale is coded according to the diameters of cores or like objects to be photographed. The functioning of these elements will be described in more detail below, in connection with a description of the operation of the apparatus as a whole.

An open-topped trough 20 containing water is mounted in the frame 2 of the table, and has a length which exceeds the length of the largest core to be photographed. The trough 20 has mounted in it, in a single plane, two support rollers 21 of rubber or like resilient material, the surface of which rollers corresponds to that of rollers employed for inking in the printing industry. The spacing and diameter of the rollers 21 are selected so as to support a core 22 having a diameter in the range from a few centimeters to a few decimeters. The different diameters of the cores 22 are coded on the scale 19, each graduation 23 of which corresponds to a specific core diameter. The core 22 may be in the form of a single unit, but more frequently comprises a plurality of pieces joined or assembled together. It is held in a lengthwise condition compressed by means of two carriage members 24 which can be moved, via one of their respective extremities, along a horizontal rod 25 which is attached to the top surface of the table 1 in parallel with the horizontal axes of the rollers 21. The other extremities of the respective members 24 are provided with rollers 26. The carriage members 24 are moved by means of small hollow manipulating blocks 27 which slide on the rod 25, each of which blocks is provide with a serrated wheel 28. The serrations of wheels 28 hold the blocks 27 (and thus the members 24) fixed in a given position on the rod 25. Thus, the core 22 is able to turn freely on rollers 21 without a possibility of being displaced longitudinally, which displacement might permit separation of the pieces comprising the core.

Humidification means is provided in the trough 20, in the form of a conduit 29 with fine spray nozzles 30 distributed regularly over the length of the conduit, the angle of the nozzles being such as to enable the core 22 to be wetted without producing splashing beyond the confines of the trough 20. The conduit 29, which is mounted below the longitudinal axes of the rollers 21, is fed from one end by means of a fluid source (not shown). Water introduced to the conduit may be under slight pressure, and there may be suction applied at the other end of the conduit beyond the trough. The spraying of water onto the core, combined with the action of the rollers 21, enables a thin film of water to be maintained on the core which is of importance. The straying of water under pressure not only enables the circumferential surface of the core to be cleaned, but it also fills any small holes which may be present on the surface, such that the core is provided with a clean and uniform surface, so as to optimize its photographic quality. The water sprayed onto the core 22 is formed into a thin film by the inking-type rollers 21. The formation and the thickness of the thin film of water are maintained at a steady state by the rotation of the rollers 21, said rotation being provided by a synchronous motor 31 and a notched drive belt 32 passing over appropriate pulleys 33 mounted on axles of the rollers 21. The constant presence, during the entire period of photography, of the thin film of water on core 22, enables the whiteness or reflectivity of the surface of the core to be increased (whiteness here being defined as the ratio of the emissivity of a body to that of an equivalent black body). The result of increasing the reflectivity of the surface is to increase the contrast in surface details of the core, thereby obtaining an improved photographic record, in that the surface of the core appears to the photographic device as equivalent to a polished surface.

Illumination of the core 22 being photographed is provided by two lamps 34 of adjustable orientation, mounted on support arms 35 rigidly attached to the support member 7. Preferably, the lamps 34 are oriented such as to produce beams of light which are incident on the core 22 at an angle of 45°, so as to avoid specular reflection entering the field of a slit (aperture) 35 provided in the photographic device 5.

Referring now to FIG. 4 in particular, the protective housing 9 is provided interiorly with a separation wall 36 which divides the interior into two spaces 37 and 38. A classical photographic camera-type apparatus 39 is disposed in the space 37, which apparatus is of a type appropriate for photographing core surfaces (for example of a type marketed by the company Linoff). In the space 38 secured on wall 36 is a synchronous motor 40 and four idler pulleys 41 (only two of which are shown in FIG. 4). A carriage 42 is moveable along slide-ways 43 affixed to wall 36, and receives a photographic plate or a flat sheet of film (designated in toto by reference numeral 44) which is a standard commercial item. The photographic plate is introduced into the housing 9 and placed on the carriage 42 through a door 45 provided in one face of the housing 9 (FIG. 2). The carriage 42 comprises two posts 46 to which small tensile springs 47 are attached, and to which springs in turn the ends of a cable 48 are attached for moving the carriage. The cable is passed around the pulleys 41. Two orifices 49 and 50 are provided in wall 36, respectively opposite the slit 35 and a first-exposure window 51. A removable cover or shutter 52, is slidably mounted in an appropriate groove 65 in wall 36, and has a vertical edge member 54 through which the shutter is urged toward a position closing off window 51 by means of a spring 55 attached to an element of wall 36. Two pushers 56 are rigidly attached to carriage 42. When the carriage moves toward the right in FIG. 4, the pushers engage against the edge member 54 so as to move the cover 52 into the open position and thus expose the first-exposure window 51.

The slit 35, which is smaller than the window 51, has a larger portion 57 and a narrower portion 58, and is disposed slightly in front of the image plane of the photographic apparatus 39. The portion 58 when viewed in cross section perpendicular to the view of FIG. 4 comprises a diverging part and a converging part (neither of which is shown). The function of slit 35 is to render homogeneous the illumination of the plane of the photographic film of the plate 44, and to obtain constant illumination along the image of the generatrix of the core being photographed. In this way, substantially the same quantity of luminous energy is obtained in every segment of the generatrix, thereby permitting subsequent digitalization of the image. This is important, because it is necessary to compensate, in the image plane, the lateral variation in illumination due to the inhomogeneity of illumination of the generatrix of the core and due to the attenuation introduced by the objective lens of the apparatus 39, as a function of the angle of the field.

The apparatus functions as follows:

The pieces of a core (or the core itself, when the core has a single integral structure) are disposed on the rollers 21 so as to define core structure 22. The core 22 is then blocked laterally by means of the carriage members 24. The diameter of the core 22 has been previously measured. Accordingly, the wheel 17 is adjusted manually such that the reference mark 18 is positioned in front of the graduation 23 of the scale 19 which graduation corresponds to the diameter of the core 22 to be photographed. This adjustment of the knurled wheel 17 causes the constant-length rod 13 to move, thereby causing the detent 15 and the reference table 14 to move, since these are rigidly attached to the rod. Thus, the height of detent 15 is set in relation to the core diameter. The device 5 is then lowered to its lower position (represented by the dot-dashed lines in FIG. 2), and is held in this lower position by catch means 59 which engage a locking member 60 mounted on the support member 7, and the photographic plate 44 is placed on the carriage 42. After this phase of adjustment and loading of the plate, the motor 31 is actuated so as to prepare the surface of the core 22 by formation of the thin film of water. The device 5 is unlocked from its lower position by tension via the base of the member 8, which releases the catch 59 from the locking member 60. The device 5 is moved upward without outside pressure, by reason of the heavier counterweight 10, until the device comes to rest against the detent 15. As a consequence, the objective lens of the photographic apparatus is automatically positioned not only over the reference plate 14 but also over the core 22, due to the proper positioning of the detent 15 which has been previously adjusted. The automatic positioning of the objective lens enables a clean image of the top of the core 22 to be obtained regardless of its diameter. The first exposure is then carried out to photograph the reference plate 14, by actuating the motor 40 so as to move the carriage 42 toward the right in FIG. 4, whereby as a result the cover 52 is also moved toward the right by means of the pushers 56. The window 51 is exposed, and the diaphragm of the photographic apparatus 39 is opened for 1/125 second. The first exposure then being completed, the motor 40 is reversed so as to move the carriage 42 toward the left in FIG. 4. The cover 52 is now no longer opened by the pushers 56, so that the cover is returned by spring 56 to the position where it covers window 51. The two motors 40 and 31 are driven synchronously, such that the linear speed of the carriage 42 is equal to the speed of rotation of the surfaces of the rollers 21, and thus to the speed of rotation of the core 22 which turns on the rollers without slipping. While the plate 44 is translated in its plane in front of the fixed slit 35, the objective of the photographic apparatus 39 forms the image of a generatrix of the core 22 on the said slit 35 which is centered on the optical axis of said objective and disposed parallel to the generatrix of the core being photographed. The selected speed of rotation of the core 22 depends on the numerical aperature value of the objective and on the illumination; the inventive apparatus enables one to operate with constant illumination intensity and variable aperture value. At the same time, since the objective inverts the image in the direction of the fixed slit, the choice of direction of rotation with respect to the direction of translation of the carriage 42 should be detrmined so as to also invert the image in the direction perpendicular to the fixed slit. The movement of the plate 44 is adjusted such that the core 22 will be photographed in 1 ½ turns, which enables the preponderance of the generatrix of the origin to be minimized, and, during a subsequent digitalization, enables edge effects to be eliminated.

Obviously, the system also comprises electrical circuitry enabling the different sequences to be carried out and providing the necessary safety measures. The circuitry will not be described since it is well known to those skilled in the art. Also not described are detents and the like, adjustable or otherwise, for limiting the displacement of the carriage 42 on the rails 43 in known manner.

While only a preferred embodiment of the invention has been described herein in detail, the invention is not limited thereby and modifications can be made within the scope of the attached claims.

I claim:

1. Apparatus for photographing a circumferential surface of revolution of a solid object comprising support means for rotatably supporting the object for rotation about the axis of said surface, a photographic device including means for moving a film at a linear velocity synchronously with the speed of rotation of the object, illumination means for the object, means for humidification of the object, and means for forming a film of fluid over said surface of the object during the photography thereof.

2. Apparstus according to claim 1 wherein the film forming means comprises means for maintaining a film of constant thickness on said surface during the photography thereof.

3. Apparatus according to claim 1 wherein the humidification means comprises a conduit with spray orifices for spraying fluid onto said surface of the object.

4. Apparatus according to claim 1 wherein the support means comprises resilient rollers, the rollers being disposed in a water tank for wetting the surfaces of the rollers and constituting the film forming means.

5. Apparatus according to claim 4 wherein the means for humidification comprises a spray conduit disposed beneath and between the rollers.

6. Apparatus according to claim 1 further including control means for selectively positioning the photographic device in a position related to the diameter of the object to be photographed.

7. Apparatus according to claim 6 including a fixed slit disposed in an image plane of the photographic device.

8. Apparatus according to claim 7 wherein the fixed slit comprises two portions of respectively different widths.

9. Apparatus according to claim 8 wherein the photographic device includes a fixed first-exposure window disposed in the image plane of the device.

10. Apparatus according to claim 1 wherein the photographic device includes a mobile film-supporting carriage and drive means for moving the carriage linearly at a speed related to the rotational speed of the support means.

11. An apparatus according to claim 6 wherein the control means comprises a rod of constant length capable of being displaced lengthwise, a detent on one end of the rod forming a stop for the photographic device, a reference plate on the other end of the rod, a reference mark on the rod between the detent and said plate, which reference mark is displaceable in front of a fixed graduated scale, each graduation of which corresponds to a given predetermined diameter of an object to be photographed.

12. Apparatus according to claim 1 including means for longitudinally compressing the object comprising displaceable members which can be moved along a fixed guide parallel to a rotational axis of the support means.

13. Apparatus according to claim 1 including a vertical support member on which the photographic device is displaceably mounted, the photographic device being connected to a counterweight having a weight slightly greater than that of the photographic device.

14. Apparatus according to claim 16 including locking means for locking the photographic device in a lowermost position on the vertical support member.

15. Apparatus according to claim 1 wherein the illumination means comprises means for providing two beams of light incident at a 45° angle on the object to be photographed.

16. Apparatus according to claim 13 wherein the photographic device includes a handle for displacing same along the support member.

17. A method of photographing a circumferential surface of revolution of an object comprising rotating the object about the axis of said surface so as to progressively present the surface to a fixed photographic device, moving a film linearly in the device across a photographic aperture at a speed related to the rotational speed of the object, and continuously forming a film of liquid over said surface of the object during the photography of same.

18. A method according to claim 17 including the step of humidifying the object during the photography of same.

* * * * *